United States Patent
Cuddy (10) Patent No.: US 6,246,761 B1
(45) Date of Patent: Jun. 12, 2001

(54) AUTOMATIC VOLUME CONTROL FOR A TELEPHONE RINGER

(75) Inventor: David Robert Cuddy, Ottawa (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 08/899,608

(22) Filed: Jul. 24, 1997

(51) Int. Cl.[7] .................................................. H04Q 7/32
(52) U.S. Cl. .................. 379/418; 379/372; 379/373; 379/375; 455/567
(58) Field of Search .................. 379/418, 373, 379/374, 375, 200, 201, 212, 179, 376, 377, 393; 381/71.8, 71.14, 102.02, 94.1, 71.2, 57

(56) References Cited

U.S. PATENT DOCUMENTS

| | | | |
|---|---|---|---|
| 4,076,968 | | 2/1978 | Wattenbarger ................ 179/84 |
| 5,224,151 | * | 6/1993 | Bowen et al. ................ 379/58 |
| 5,297,198 | * | 3/1994 | Butani et al. ................ 381/57 |
| 5,337,353 | * | 8/1994 | Boie et al. ................ 379/388 |
| 5,337,356 | * | 8/1994 | Shinozaki ................ 379/418 |
| 5,379,338 | * | 1/1995 | Umemoto et al. ................ 379/58 |
| 5,452,354 | * | 9/1995 | Kyronlahti et al. ................ 379/373 |
| 5,479,476 | * | 12/1995 | Finke-Anlauff ................ 379/58 |
| 5,537,657 | * | 7/1996 | King, III ................ 379/179 |
| 5,617,472 | | 4/1997 | Yoshida et al. ................ 379/390 |
| 5,649,007 | * | 7/1997 | Yamada ................ 379/373 |
| 5,712,911 | * | 1/1998 | Her ................ 379/420 |
| 5,729,604 | * | 3/1998 | Van Schyndel ................ 379/388 |
| 5,764,751 | * | 6/1998 | Konishi ................ 379/373 |
| 5,844,983 | * | 12/1998 | Lilja ................ 381/57 |
| 5,872,852 | * | 2/1999 | Dougherty ................ 381/57 |
| 5,884,156 | * | 3/1999 | Gordon ................ 455/350 |
| 6,002,949 | * | 12/1999 | Hawker et al. ................ 455/569 |
| 6,044,279 | * | 3/2000 | Hokao et al. ................ 455/567 |

FOREIGN PATENT DOCUMENTS

| | | |
|---|---|---|
| 0 507 482 | 10/1992 | (EP). |
| 0781071 | 6/1997 | (EP). |
| WO 97/16932 * | 5/1997 | (WO) ................ H04Q/7/18 |

OTHER PUBLICATIONS

Derwent World Patent Index Record of Japanese Application 2058952, published on Feb. 28, 1990, in Addition to cover page the drawings of application.

* cited by examiner

Primary Examiner—Forester W. Isen
Assistant Examiner—Clark S. Cheney (57) ABSTRACT

A telephone is provided with a means for automatically generating ringing tones to be heard by a user over ambient noise and in spite of any muffling environment in which the telephone may be located. The ambient noise is measured to determine its amplitude and frequency characteristics and appropriate amplitude and frequency characteristics of ringing tones to be heard by a user over the ambient noise are calculated and generated. The degree to which the ringing tones are muffled by the muffling environment is calculated and suitable amplitude and frequency characteristics of further ringing tones necessary to be heard by a user in spite of the muffling environment are calculated and further ringing tones having the suitable amplitude and frequency characteristics are generated.

16 Claims, 4 Drawing Sheets

AUTOMATIC VOLUME CONTROL FOR A TELEPHONE RINGER

FIELD OF THE INVENTION

The invention relates to portable telephones and is particularly concerned with a technique for automatically controlling the audible characteristics of ringing tones in portable telephones.

BACKGROUND OF THE INVENTION

Unlike conventional telephones, portable telephones do not typically reside in a fixed location on a desktop, table or wall. Portable telephones often travel with their owners in cars, offices, parks, golf courses, etc. Accordingly, both the physical environment and acoustic environment surrounding the telephone change.

This environmental variability may prevent or hinder the user from hearing the ringing of the telephone. For example, if the user moves to a noisy environment, the ambient noise may interfere with the user being able to hear the ringing tones of the telephone. Similarly, if the user carries the telephone in a pocket, briefcase or purse, for example, the ringing tones may be muffled or reflected by the environment immediately surrounding the telephone, thereby also obscuring the sound of the ringer. In either scenario, the user may not be able to hear the ringing tones, thereby possibly missing a call.

Portable telephones typically provide a means for the user to manually adjust the volume (ie: amplitude) of the ringing tones. Such manual methods require the user to pre-select the desired volume of the ringing tone in anticipation of the required volume at the time that an incoming call subsequently arrives. However, if the user forgets (or simply neglects) to increase the volume of the ringing tones prior to entering a noisy location or prior to placing the telephone in a muffling environment (a briefcase or pocket, for example), the user may not then be able to hear the ringing tones. Alternatively, if the user has previously set the ringing tones to a loud volume and the user moves to a quiet environment, the resulting volume of the ringing tones may startle or disturb those in the local vicinity.

One known method of addressing the problem of increasing an alerting signal to a volume sufficient to be heard by a user has been implemented in some models of consumer alarm clocks and clock radios. Using this method, the initial volume of the alarm is set at a pre-determined level. If the user fails to intervene (eg: if the user fails to turn off the alarm), then after a pre-determined time interval, the volume of the alarm is increased by a pre-determined amount. In this manner, the volume of the alarm will continue to increase until it reaches some pre-determined maximum volume or the need for the alarm ceases. However, such a method would be of marginal effectiveness with respect to telephony, since an unanswered call will typically either be abandoned by the calling party or else answered by an answering machine or voice mail system prior to the time required for the volume of the alarm to reach the necessary level to be heard by the user.

The prior art also reveals, for example, European patent application No. 92302479.8 in the name of Nokia Mobile Phones Ltd., published on Oct. 7, 1992, disclosing a telephone apparatus which senses the ambient noise level and adjusts the volume of the ringing tones accordingly. While such a device may operate effectively when the telephone is located in the same open space as the user, when the phone is located in a pocket, briefcase or purse, for example, the apparatus disclosed in the Nokia application would evaluate the ambient noise level without taking into account that the ringing tones generated by the telephone could be significantly muffled or obstructed by the environment immediately surrounding the telephone (pocket fabric, briefcase or purse). Indeed, if the Nokia device is located in an enclosed muffling environment (eg: a purse or briefcase), the amplitude of the ambient noise will be attenuated by the surrounding muffling materials. The Nokia device may therefore be "tricked" and fail to increase the volume of the ringing when such an adjustment is required. Further, while the device contemplated by the Nokia patent considers the amplitude of the ambient noise, it fails to consider the frequency or temporal characteristics of the ambient noise.

The prior art does reveal a method which attempts to determine whether or not a telephone is located within a briefcase. For example, (the Derwent English language summary of) Japanese application 2058952 in the name of Matsushita Elec Ind KK, published on Feb. 28, 1990, discloses a telephone device which increases the volume of the ringing tone when the device detects low lighting (apparently, low lighting suggests that the telephone is located within a briefcase). However, such a solution does not take into account the possibility that the telephone may be located in a dark room beside the user rather than in a briefcase. As well, this solution does not consider the different degrees to which the local environment may muffle the ringing tone. For example, the loudness of the ringing tone may have to be increased if the telephone is transferred from a thin fabric pocket to a more substantial briefcase.

SUMMARY OF THE INVENTION

It is an object of the invention is to obviate or mitigate one or more of the above identified disadvantages.

According to a first broad aspect, the invention provides a telephone for generating ringing tones to be heard by a user over ambient noise comprising an ambient noise analysis means for determining at least one of the amplitude and frequency characteristics of the ambient noise; a calculation means for calculating appropriate audible characteristics of ringing tones to be heard by a user over the ambient noise wherein the audible characteristics comprise at least one of the amplitude, frequency and cadence characteristics of the ringing tones; and a ringing tone generating means for generating ringing tones with the appropriate audible characteristics.

According to a second broad aspect, the invention provides a telephone for generating ringing tones to be heard by a user over ambient noise and in spite of an environment immediately surrounding the telephone, if any, comprising an ambient noise analysis means for determining at least one of the amplitude and frequency characteristics of the ambient noise; a calculation means for calculating appropriate audible characteristics of ringing tones to be heard by a user over the ambient noise, wherein the audible characteristics comprise at least one of the amplitude, frequency and cadence characteristics of the ringing tones; a ringing tone generating means for generating ringing tones with the appropriate audible characteristics; an environment analysis means for determining the effect on the ringing tones of the environment immediately surrounding the telephone, if any; a further calculation means for calculating further appropriate audible characteristics of further ringing tones to be heard by a user in spite of the environment immediately surrounding the telephone, if any, wherein the further audible characteristics comprise at least one of the amplitude, frequency and cadence characteristics of the ringing tones; and a ringing tone generating means for generating the further ringing tones with the further appropriate audible characteristics.

According to a third broad aspect, the invention provides a telephone for generating ringing tones to be heard by a user in spite of an environment immediately surrounding the telephone, if any, comprising a probe signal generating means for generating an acoustic probe signal suitable for determining the effect on subsequently generated ringing tones of the environment immediately surrounding the telephone; an environment analysis means for determining the effect on the probe signal of the environment immediately surrounding the telephone, if any; a ringing tone calculation means for calculating appropriate audible characteristics of ringing tones to be heard by a user in spite of the environment immediately surrounding the telephone wherein the audible characteristics comprise at least one of the amplitude, frequency and cadence characteristics of the ringing tone; and a ringing tone generating means for generating ringing tones with the appropriate audible characteristics.

In a preferred embodiment of the invention there is provided a telephone which automatically adjusts the audible characteristics (amplitude, frequency and/or cadence) of its ringing tones to overcome ambient noise and the effect of the environment immediately surrounding the telephone (which could be absorptive and/or reflective), thereby increasing the likelihood that the user will not miss calls and accordingly also increasing revenues for the telephone network provider as a result of fewer missed calls.

BRIEF DESCRIPTION OF THE DRAWINGS

Preferred embodiments of the invention will now be described with reference to the attached drawings in which.

DETAILED DESCRIPTION OF THE PREFERRED EMBODIMENT

As described below, when considering the characteristics of ringing tones to be heard over ambient noise or in spite of a muffling environment, it is desirable to consider not only the amplitude of the ambient noise and the ringing tones, but also to consider their constituent frequencies. For example, ambient noise of a given frequency and a given amplitude may be more occlusive than ambient noise of a different frequency and the same amplitude. This effect is known as masking. Accordingly, one method to help ensure that the ringing tones may be heard over ambient noise is to generate ringing tones of a frequency sufficiently different from that of the ambient noise to avoid masking of the ringing tones by the ambient noise. The optimal variation of amplitude or frequency of the ringing tones with respect to ambient noise of a given frequency and amplitude is determined empirically from field tests.

Another technique to help the user hear ringing tones over ambient noise or in spite of a muffling environment, which can be used separately or in combination with modification of the frequency or amplitude of the ringing tones, is to modify the cadence of the ringing tones. The cadence of the ringing tones is essentially the ringing pattern. Increased cadence is typically more noticeable to the user than less rapid cadence.

The preferred embodiment of the present invention relates to cellular telephones, and the following description will only refer to cellular telephones. However, with modifications obvious to one skilled in the art, typical non-cellular, cordless telephones and other portable devices can be modified to incorporate the elements of the invention.

Figure 1:
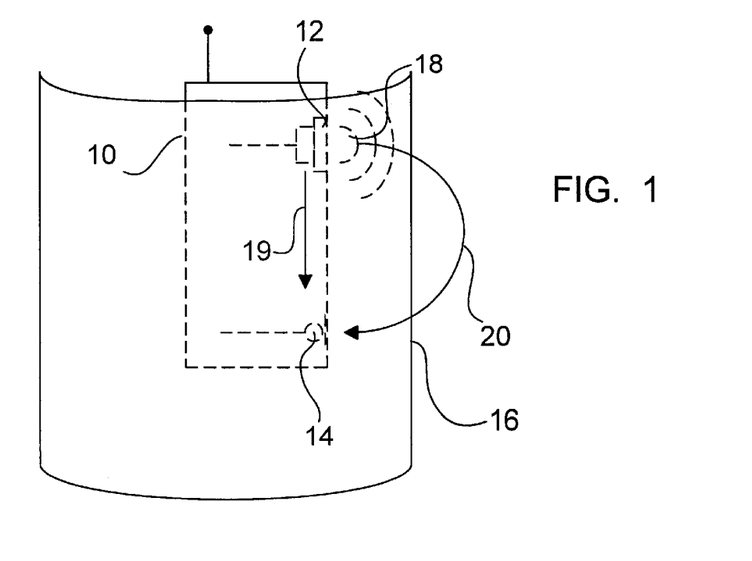
FIG. 1 is a simplified representation of a telephone emitting ringing tones in a muffling environment.

As shown in FIG. 1, which is a simplified diagram of a portable telephone in use, a telephone generally designated 10 includes a transducer 12 and a microphone 14. The telephone 10, as shown in FIG. 1, is located within a muffling environment 16. A portion of the ringing tones 18 emitted from transducer 12 travel to microphone 14 with little attenuation, as represented by arrow 19. Some of the ringing tones 18 emitted from transducer 12 are attenuated by the muffling environment 16 prior to arriving at microphone 14 as indicated by arrow 20. This attenuation may affect some frequencies more than others, depending upon the nature of the muffling environment.

Figure 2:
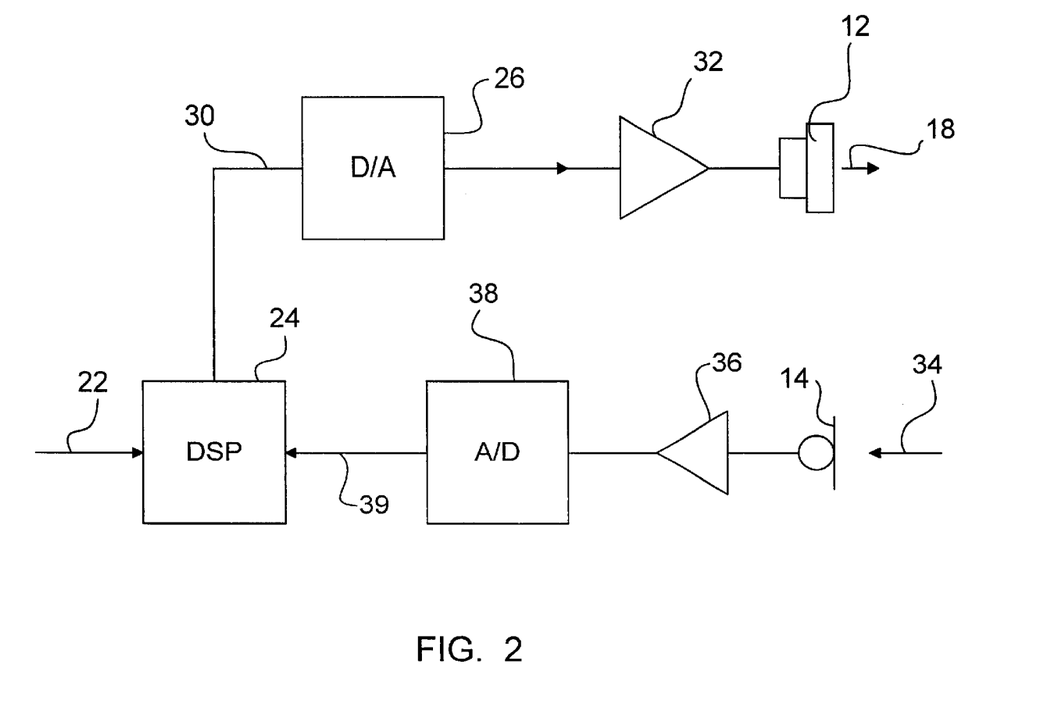
FIG. 2 is a block diagram of part of a telephone circuit according to the preferred embodiment of the present invention.

As shown in FIG. 2, which is a block diagram of the preferred embodiment of the present invention, a trigger signal input 22 is connected between a microprocessor (not shown) and a signal processor 24. The output of the signal processor 24 is connected to a digital-to-analog converter 26 via a line 30. An output of the digital-to-analog converter 26 is connected to an amplifier 32. The amplifier 32 is connected to the transducer 12 which emits ringing tones 18. The microphone 14 which receives acoustic signals 34 is connected to a pre-amplifier 36 which in turn is connected to an analog-to-digital converter 38 which in turn is connected to the signal processor 24 via a line 39.

The signal processor 24 could incorporate one or more processing chips or, if the analog-to-digital converter 38 is not used, the signal processor 24 could incorporate a combination of analog circuitry and one or more processing chips. In the preferred embodiment, the signal processor is a digital signal processing ("DSP") chip 24.

The DSP chip 24, a type of microprocessor, is typically separate from the telephone's main microprocessor (not shown). As well as acting as a signal analyzer (which analyzes signals supplied by the microphone 14 through the pre-amplifier 36 and the analog-to-digital converter 38) the DSP chip 24 also runs the software which controls the processes described below. The telephone circuitry also includes other conventional components such as filters and the like (which are not shown in FIG. 2) and together with the pre-amplifier 36 and the analog-to-digital converter 38 constitute signal processing circuitry.

Figure 3:
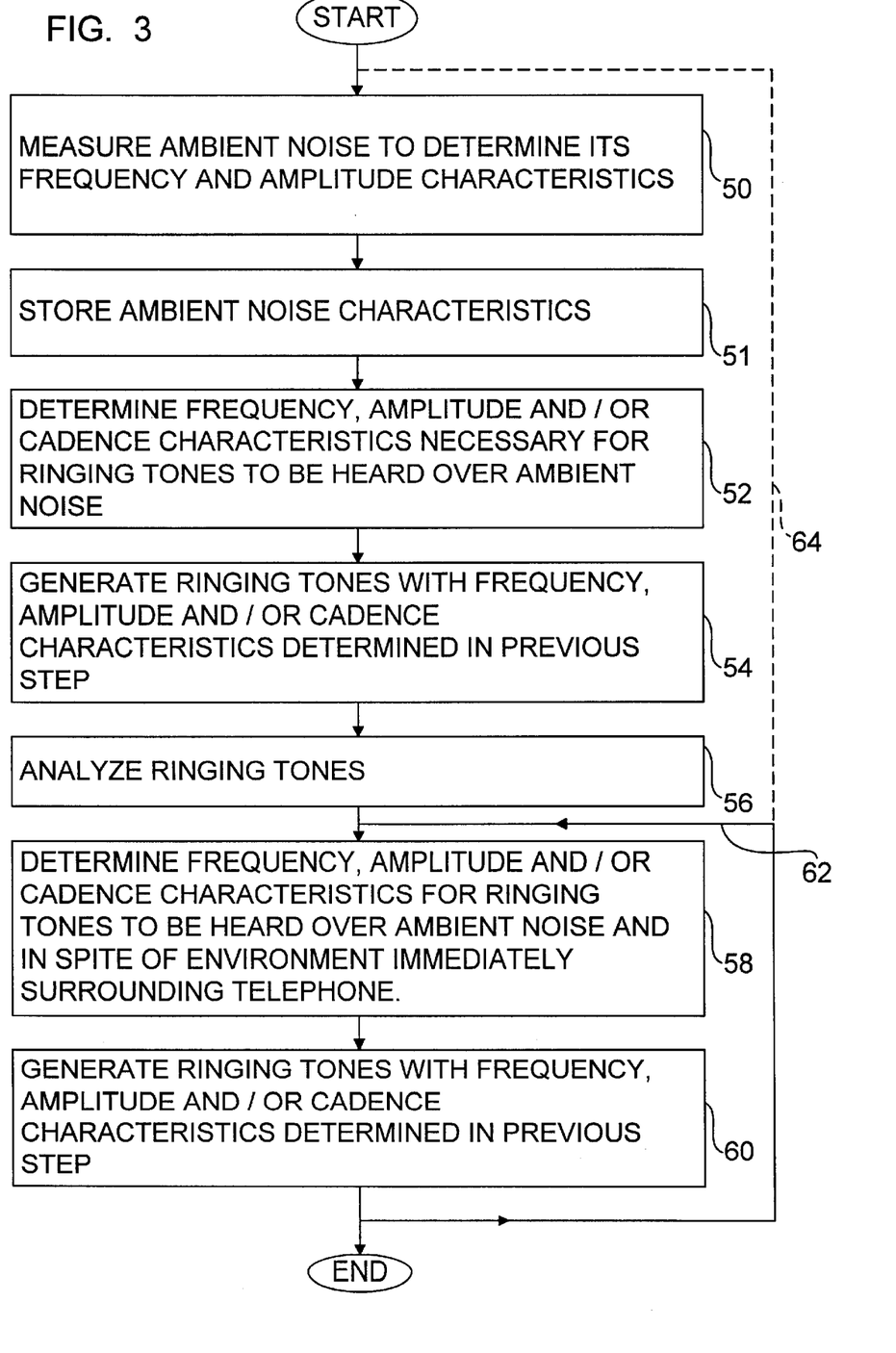
FIG. 3 is a flow chart depicting the process steps carried out by the preferred embodiment of the present invention.
Figure 4:
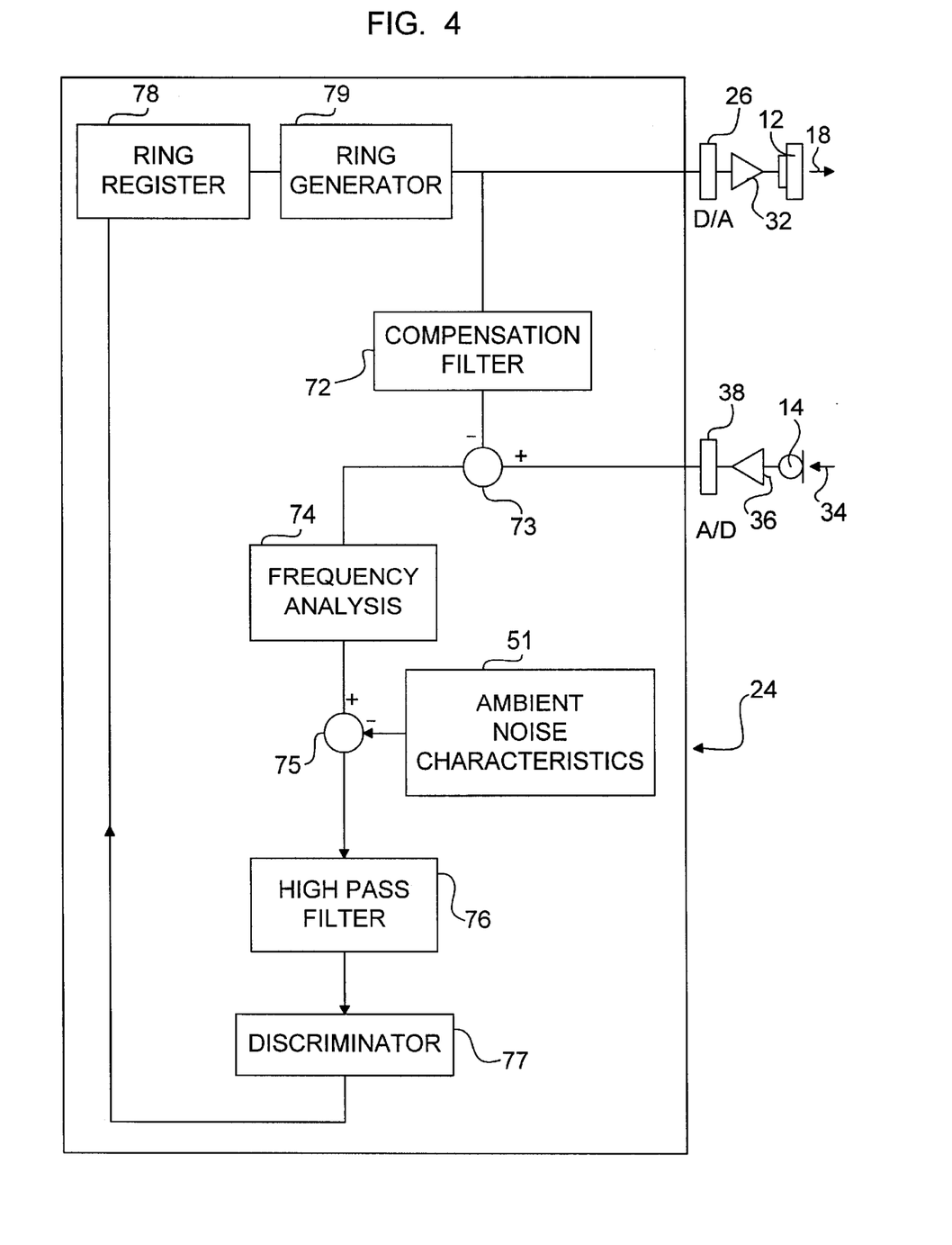
FIG. 4 is a functional block diagram of the DSP chip of FIG. 2.

The DSP chip 24 has stored therein one or more programs which carry out the process steps shown in the flow chart of FIG. 3, some of which are represented by the blocks of the block diagram of FIG. 4.

In use, when the DSP chip 24 receives a signal on input 22 from the microprocessor that there is an incoming call, the DSP chip 24 begins to analyze the characteristics of the incoming (ambient noise) signal from the microphone 14 as indicated at block 50. Representations of the ambient noise characteristics are stored at block 51 for later consideration at blocks 52 and 58. Then, the DSP chip 24 determines audible characteristics of the ringing tones necessary to be heard over the ambient noise as indicated at block 52, and the DSP chip 24 generates a signal having appropriate audible characteristics through the digital-to-analog converter 26, the amplifier 32 and the transducer 12 as indicated at block 54.

The appropriate audible characteristics can be any combination of variations from a "default" amplitude, frequency or cadence of the ringing tones. For example, the appropriate audible characteristics may involve only an increase of the amplitude of the "default" ringing tones, or it may involve an increase in the amplitude and frequency, or an increase in the frequency and an decrease in the cadence or an increase in all three, etc.

The ringing tones, which are emitted from the transducer 12, are picked up by the microphone 14 and the resulting electrical signals exiting from the pre-amplifier 36 and the analog-to-digital converter 38 are analyzed by the DSP chip 24 as indicated at block 56. Analysis of the ringing tones in this manner provides data as to the degree to which the ringing tones have been attenuated (which may be substantial if the telephone is in a muffling environment such as in a purse or briefcase, for example). Appropriate characteristics of the ringing tones necessary to overcome both the ambient noise and the muffling caused by the environment immediately surrounding the telephone are then calculated by the DSP chip 24 as indicated at block 58. The DSP chip 24 then generates ringing tones having the appropriate audible characteristics through the digital-to-analog converter 26, the amplifier 32 and the transducer 12 as indicated at block 60. Subsequent testing of the ambient noise and muffling environment can be performed to determine more accurately the optimal audible characteristics of the ringing tones and to make appropriate adjustments until the user answers the telephone or until the caller hangs up. Each of these steps is described further below.

As described above with reference to block 50 of FIG. 3, the DSP chip 24 analyzes the incoming ambient noise. To one skilled in the art, there are many ways to analyze an acoustic signal to determine its characteristics, including analog and digital techniques. In the preferred embodiment, the acoustic signal is analyzed by analysis algorithms performed by the DSP chip 24 to determine its amplitude and frequency characteristics. The DSP chip 24 then calculates an initial set of audible characteristics necessary for ringing tones to be heard by the user over the ambient noise (block 52 of FIG. 3). This calculation can be accomplished using many different methods. One method is for the DSP chip 24 to consult a look-up table in the DSP chip's memory incorporating records relating to different possible ranges of amplitude and frequency characteristics of the ambient noise. For each record, there is a corresponding record incorporating information relating to the necessary change (over a default setting) of audible characteristics of the ringing tones to be heard over the ambient noise. The values in the corresponding record are determined empirically from field tests.

Of course, the appropriate audible characteristics of the ringing tones could also be determined by means of calculations determined by empirical testing. For example, if the ambient noise has frequency and amplitude characteristics X and Y, respectively, then the audible characteristics of the ringing tones may have to be varied relative to X and Y (according to a particular, empirically determined function) to overcome the ambient noise.

The DSP chip 24 then sends a signal on line 30 incorporating the appropriate audible characteristics to generate, through the digital-to-analog converter 26, the amplifier 32 and the transducer 12, ringing tones 18.

As described above with respect to block 56 of FIG. 3, a test is then conducted to determine if the telephone 10 is in a muffling environment 16. One skilled in the art will know of various techniques for sensing the proximity of absorptive or muffling materials (which may interfere with the transmission of ringing tones) including optical, infra-red or capacitive sensors. In the preferred embodiment, in order to determine if the telephone is in a muffling environment, the DSP chip 24 performs a spectral analysis on the portion of the ringing tones arriving at the microphone 34.

The acoustic properties of an initial set of ringing tones are preferably chosen to be rich in higher frequencies so as to be sensitive to sound attenuation caused by typical muffling environments such as clothing, purses, etc. The initial set of ringing tones may be conventional ringing tones generated by the telephone 10, designed to include higher frequencies. In other words, it is preferable to produce an initial set of ringing tones or a probe signal with particular frequency properties. For example, the probe signal, which could be "ringing tones", could also be a signal which may not sound like standard telephone tones. For example, the probe signal could be a broadband signal, such as white noise, which could include all frequencies, to allow a better determination of which frequencies are being attenuated by the environment immediately surrounding the telephone. The probe signal could be generated by a separate probe signal generator (not shown). However, in the preferred embodiment, the DSP chip 24 (in combination with the digital-to-analog converter 32, amplifier 32 and transducer 12) would be able to produce an appropriate probe signal and thus, a separate probe signal generator would not be necessary.

It should be noted that if the telephone 10 is located within a muffling environment 16, a portion of the ringing tones emitted from transducer 12 will be attenuated prior to reaching microphone 10. However, as shown in FIG. 1, a portion of the ringing tones 18 from transducer 12 will travel to microphone 14 directly, independent of the environmental materials, as represented by arrow signal 19. As described below, in order to determine the amplitude and frequency characteristics of the attenuated signal, it is desirable to subtract the characteristics of the direct signal represented by arrow 19 from the entire acoustic signal 34 reaching microphone 14.

All or part of the ringing tones 18 generated by the DSP chip 24 through the digital-to-analog converter 26, the amplifier 32 and the transducer 12, depending upon the degree to which the acoustic signal is muffled or attenuated by the muffling environment 16, will travel to the microphone 14.

Since the acoustic signal 34 comprises the sum of (a) the ambient noise, (b) the portion of the ringing tones that travelled directly from the transducer 12 to the microphone 14 and (c) the attenuated portion 20 of the ringing tones 18 that travelled from the transducer 12 to the microphone 14, the DSP chip 24 must determine the portion of the acoustic signal 34 constituting only the attenuated ringing tones by subtracting the signal characteristics of (a) and (b) from signal 34.

FIG. 4, a functional block diagram of the DSP chip of FIG. 2, shows some of the steps performed by the DSP chip 24. The output signal 30 from a ring generator 79 is applied to a compensation filter 72. The compensation filter 72 approximates the transmission characteristics of the direct acoustic path 19 (see FIG. 1). At summing node 73, the output from compensation filter 72 is subtracted from the input signal 39, thereby effectively removing the contribution of the direct path signal 19 from the acoustic signal 34 received by the microphone 14.

At block 74, a frequency analysis is performed upon the output from summing node 73. Typically, the frequency analysis would be accomplished using a fast Fourier Transform algorithm, which is a signal processing technique familiar to those skilled in the art. At summing node 75, the ambient noise characteristics, which were stored at block 51 (FIGS. 3 and 4), are subtracted from the output of block 74, in order to compensate for the impact of any ambient noise.

The output from node 75, representing the signal characteristics of the attenuated ringing tones, is analyzed by the DSP chip 24 at block 76, which performs a high pass filter function. The process at block 76 selectively attenuates low-frequencies and passes high frequencies (or the representations of these frequencies), since high frequencies are more subject to attenuation by external materials. Smaller amounts of high frequency energy are indicative of a greater attenuation of the ringing tones. Output from block 76 is passed to block 77 which performs a discriminator function to determine the characteristics of the attenuated signal 20 and thereby infer the nature of the muffling materials. Then, enhanced ringing tones can be produced which are suitable to be heard by a user in spite of the muffling environment. The appropriate audible characteristics of the ringing tones can be determined in many ways which would be obvious to one skilled in the art, including the methods described above with respect to determining appropriate characteristics of ringing tones to be heard over ambient noise, such as by the use of a look-up table or by means of calculations.

The output of block 77 is passed to a ring register 78 which stores the audible characteristics or parameters (frequently, amplitude, cadence) derived from discriminator 77 and used to drive ring generator 79. In the preferred embodiment, the ring register 78 is updated after each ringing burst with the newly-determined ringing characteristics (the output from discriminator 77). In this manner, the ringing tones or the ringing signal can be dynamically adjusted as the environment changes.

The output of block 78 is passed to block 79 which performs a ring generator function by generating through the digital-to-analog converter 26, the amplifier 32 and the transducer 12 ringing tones having the appropriate audible characteristics.

Figure 6:
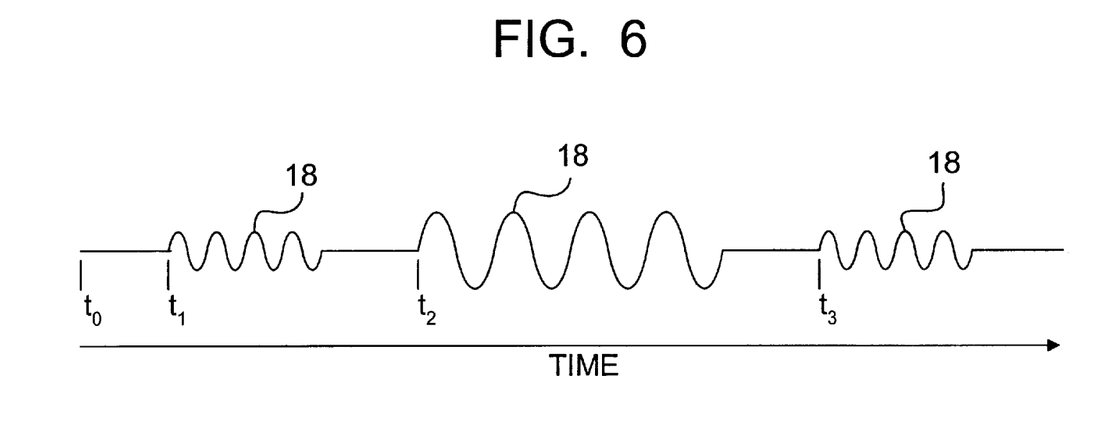
FIG. 6 is a plot of representations of ringing tones 18 of FIG. 2, at different times during the execution of the steps in the flow chart of FIG. 3.

Some of the sequence of events may be further described by reference to FIG. 6, which is a plot of the ringing tones 18 of FIG. 2, shown at different times during the execution of the steps in the flow chart of FIG. 3. An incoming telephone call arrives at time t0. From time t0 to time t1, the ambient noise is analyzed (block 50 of FIG. 3) to determine initial ringing tone characteristics or parameters, which are loaded into ring register 78. At time t1, a first burst of ringing tones 18 is generated (block 54 of FIG. 3) and the ringing tones received by microphone 14 are analyzed (block 56 of FIG. 3). New ringing tone parameters are calculated (block 58 of FIG. 3) and loaded into ring register 78. A new burst of ringing tones 18 is generated at time t2 in accordance with the ringing tone parameters stored in ring register 78 (block 60 of FIG. 3).

Figure 5:
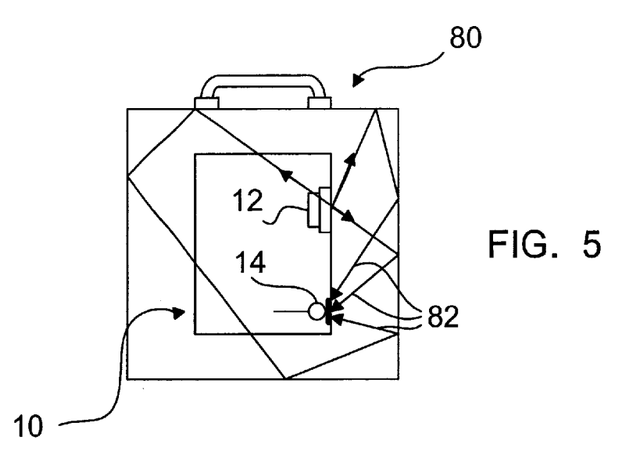
FIG. 5 is a simplified representation of a telephone emitting ringing tones in a reflective environment.

There are two general types of signal processing well-known to those skilled in the art, namely frequency-domain analysis and time-domain analysis. Both techniques can be used to infer an environment external to a telephone. In the preferred embodiment, frequency-domain analysis, as described above, is used to estimate the nature of muffling materials, if any, surrounding the telephone. However, where the telephone is located within a mostly reflective environment (as opposed to a mostly absorptive environment) time-domain analysis may be more useful. FIG. 5 illustrates such a case where the ringing tones, instead of being absorbed by surrounding materials, are reflected by an enclosure.

To determine if the telephone 10 is in a predominantly reflective environment, as opposed to a predominantly absorptive environment, time-domain analysis can be used. For example, if a telephone is located in a typical fabric pocket, some of the ringing tones emitted by transducer 12 would be attenuated but relatively little would be reflected. However, if the telephone is located in a metal briefcase, for example, very little of the ringing tones would be attenuated, but a relatively large amount would likely be reflected by the surrounding surfaces. By using time-domain analysis, the extent to which ringing tones are reflected can be calculated (or estimated), and appropriate characteristics for further ringing tones can be calculated to be heard in spite of the reflecting environment.

As shown in FIG. 5, which is a simplified representation of a telephone emitting ringing tones in a reflective environment, if a telephone 10 is located in a reflecting environment 80, such as a metal-sided briefcase, for example, ringing tones may produce a number of acoustic reflections 82. Given that sound waves travel at approximately 1 foot per millisecond, and given the number of reflections 82 impinging upon microphone 14, it is possible, using well-known techniques, such as time-domain reflectometry, to determine the presence or absence of reflective surfaces nearby the telephone 10. For example, a relatively large number of reflections occurring within a short interval (typically 1–2 ms), is indicative of several reflective surfaces. It will be apparent that a combination of time-domain and frequency domain analysis can be used to produce a more accurate estimation of the materials surrounding the telephone than either analysis separately.

Repeated sensing of the ambient noise and the muffling environment will typically yield more accurate results than those produced during the initial sensing period. In the preferred embodiment, repeated analyses are performed to determine and accommodate variations in the telephone's environment. As shown by a line 62 in FIG. 3, the steps represented at blocks 56 through 60 (analysis of muffling environment) can be repeated, as necessary. Alternatively, as shown by a broken line 64 in FIG. 3, all the steps represented at blocks 50 through 60 (analysis of ambient noise and muffling environment) can instead by repeated, as necessary.

The usefulness of repeated analysis is shown in the following example. If the user hears the telephone ringing from within a pocket and then removes the telephone from the pocket, the loudness of the ringing tones should be reduced accordingly, which can be accomplished by repeated analysis of the muffling environment and modifying the ringing tones as appropriate.

Numerous modifications and variations of the present invention are possible in light of the above teachings. It is therefore to be understood that within the scope of the appended claims, the invention may be practised otherwise than as specifically described herein. Some examples of possible modifications are the following: the microphone 14 could be different from and located elsewhere than the main telephone mouthpiece and there could be two or more microphones apart from the main microphone; the transducer 12 could be different from and located elsewhere than the main telephone transducer and there could be two or more transducers apart from the main transducer; the functions described above with respect to the DSP chip 24 could conceivably be performed by filters and other circuitry; or the function of the DSP chip 24 could be performed within the telephone's main microprocessor or could be split between the DSP chip 24 and the main microprocessor. Although in the embodiment described above, both the ambient noise and the muffling environment are taken into consideration, either analysis could be considered alone in a telephone.

What is claimed is:

1. A telephone for generating ringing tones to be heard by a user over ambient noise and in spite of any muffling environment immediately surrounding the telephone, comprising
    (a) an ambient noise analysis means for determining at least one of the amplitude and frequency characteristics of the ambient noise;
    (b) a calculation means for calculating appropriate audible characteristics of ringing tones to be heard by a user over the ambient noise as calculated by the ambient noise analysis means, wherein the audible characteristics comprise at least one of the amplitude, frequency and cadence characteristics of the ringing tones;
    (c) a ringing tone generating means for generating ringing tones with the appropriate audible characteristics as calculated by the calculation means;
    (d) a means for determining if the telephone is located within a muffling environment comprising an environment analysis means for determining the effect on the ringing tones, generated by the ringing tone generating means, of any muffling environment immediately surrounding the telephone;
    (e) a further calculation means for calculating further appropriate audible characteristics of further ringing tones to be heard by a user in spite of any muffling environment immediately surrounding the telephone, the muffling environment immediately surrounding the telephone having been determined by the environment analysis means, wherein the further audible characteristics comprise at least one of the amplitude, frequency and cadence characteristics of the ringing tones; and
    (f) a ringing tone generating means for generating the further ringing tones with the further appropriate audible characteristics as calculated by the further calculation means.

2. The telephone of claim 1 wherein each of the ambient noise analysis means and the environment analysis means comprises a microphone, signal processing circuitry connected to an output of the microphone and a signal analyzer means connected to an output of the signal processing circuitry.

3. The telephone of claim 2 wherein the signal processing circuitry comprises a pre-amplifier and an analog to digital converter.

4. The telephone of claim 3 wherein the signal analyzer means comprises a digital signal processing chip.

5. The telephone of claim 1 wherein the calculation means comprises a look-up table comprising records wherein each record relates to different possible ranges of the amplitude and frequency characteristics of the ambient noise and wherein for each record there is a corresponding record comprising representations of appropriate audible characteristics of ringing tones to be heard by a user over the ambient noise.

6. The telephone of claim 1 wherein the environment analysis means determines at least one of the extent to which the ringing tones have been absorbed by any muffling environment immediately surrounding the telephone and the extent to which the ringing tones have been reflected by any muffling environment immediately surrounding the telephone.

7. The telephone of claim 6 wherein the environment analysis means performs at least one of a frequency-domain analysis and a time domain analysis.

8. A telephone for generating ringing tones to be heard by a user over ambient noise and in spite of any muffling environment immediately surrounding the telephone, comprising
    (a) an ambient noise analysis means for determining at least one of the amplitude and frequency characteristics of the ambient noise;
    (b) a calculation means for calculating appropriate audible characteristics of ringing tones to be heard by a user over the ambient noise wherein the audible characteristics comprise at least one of the amplitude, frequency and cadence characteristics of the ringing tones;
    (c) a ringing tone generating means for generating ringing tones with the appropriate audible characteristics;
    (d) a means for determining if the telephone is located within a muffling environment comprising an environment analysis means for determining the effect on the ringing tones of any muffling environment immediately surrounding the telephone;
    (e) a further calculation means for calculating further appropriate audible characteristics of further ringing tones to be heard by a user in spite of any muffling environment immediately surrounding the telephone, wherein the further audible characteristics comprise at least one of the amplitude frequency and cadence characteristics of the ringing tones; and
    (f) a ringing tone generating means for generating the further ringing tones with the further appropriate audible characteristics;
    wherein each of the ambient noise analysis means and the environment analysis means comprises a microphone, signal processing circuitry connected to an output of the microphone and a signal analyzer means connected to an output of the signal processing circuitry;
    wherein the signal processing circuitry comprises a pre-amplifier and an analog to digital converter;
    wherein the signal analyzer means comprises a digital signal processing chip;
    wherein the digital signal processing chip performs a series of steps comprising
        (i) subtracting the amplitude and frequency characteristics of the ambient noise from audible characteristics of a signal received by the microphone;
        (ii) approximating the transmission properties of the direct path unattenuated ringing tones;
        (iii) subtracting the result of step (ii) from the result of step (i);
        (iv) performing a high pass filter function on the result of step (iii); and
        (v) performing a discriminator function on the result of step (iv).

9. A telephone for generating ringing tones to be heard by a user in spite of any muffling environment immediately surrounding the telephone, comprising
  (a) a probe signal generating means for generating an acoustic probe signal suitable for determining the effect on subsequently generated ringing tones of any muffling environment immediately surrounding the telephone;
  (b) a means for determining if the telephone is located within a muffling environment comprising an environment analysis means for determining the effect on the probe signal generated by the probe signal generating means, of any muffling environment immediately surrounding the telephone;
  (c) a ringing tone calculation means for calculating appropriate audible characteristics of ringing tones to be heard by a user in spite of any muffling environment immediately surrounding the telephone, the environment having been determined by the environment analysis means, wherein the audible characteristics comprise at least one of the amplitude, frequency and cadence characteristics of the ringing tone; and
  (d) a ringing tone generating means for generating ringing tones with the appropriate audible characteristics as calculated by the ringing tone calculation means.

10. The telephone of claim 9 wherein the probe signal is a ringing tone.

11. The telephone of claim 9 wherein the environment analysis means comprises a microphone, signal processing circuitry connected to an output of the microphone and a signal analyzer means connected to an output of the signal processing circuitry.

12. The telephone of claim 11 wherein the signal processing circuitry comprises a pre-amplifier and an analog to digital converter.

13. The telephone of claim 12 wherein the signal analyzer means comprises a digital signal processing chip.

14. The telephone of claim 9 wherein the environment analysis means determines at least one of the extent to which the probe signal has been absorbed by any environment immediately surrounding the telephone and the extent to which the probe signal has been reflected by any muffling environment immediately surrounding the telephone.

15. The telephone of claim 14 wherein the environment analysis means performs at least one of a frequency-domain analysis and a time domain analysis.

16. A telephone for generating ringing tones to be heard by a user in spite of any muffling environment immediately surrounding the telephone, comprising
  (a) a probe signal generating means for generating an acoustic probe signal suitable for determining the effect on subsequently generated ringing tones of any muffling environment immediately surrounding the telephone;
  (b) a means for determining if the telephone is located within a muffling environment comprising an environment analysis means for determining the effect on the probe signal of any muffling environment immediately surrounding the telephone;
  (c) a ringing tone calculation means for calculating appropriate audible characteristics of ringing tones to be heard by a user in spite of any muffling environment immediately surrounding the telephone, wherein the audible characteristics comprise at least one of the amplitude, frequency and cadence characteristics of the ringing tone; and
  (d) a ringing tone generating means for generating ringing tones with the appropriate audible characteristics;
  wherein the probe signal is a ringing tone;
  wherein the environment analysis means comprises a microphone, signal processing circuitry connected to an output of the microphone and a signal analyzer means connected to an output of the signal processing circuitry;
  wherein the signal processing circuitry comprises a pre-amplifier and an analog to digital converter;
  wherein the signal analyzer means comprises a digital signal processing chip;
  wherein the digital signal processing chip performs a series of steps comprising
    (i) approximating the signal properties of a probe signal that traveled directly to the microphone;
    (ii) subtracting the result of step (i) from the signal properties of the probe signal received by the microphone;
    (iii) performing a frequency analysis on the result of step (ii); and
    (iv) performing a discriminator function on the result of step (iii).

* * * * *